Figure 1:
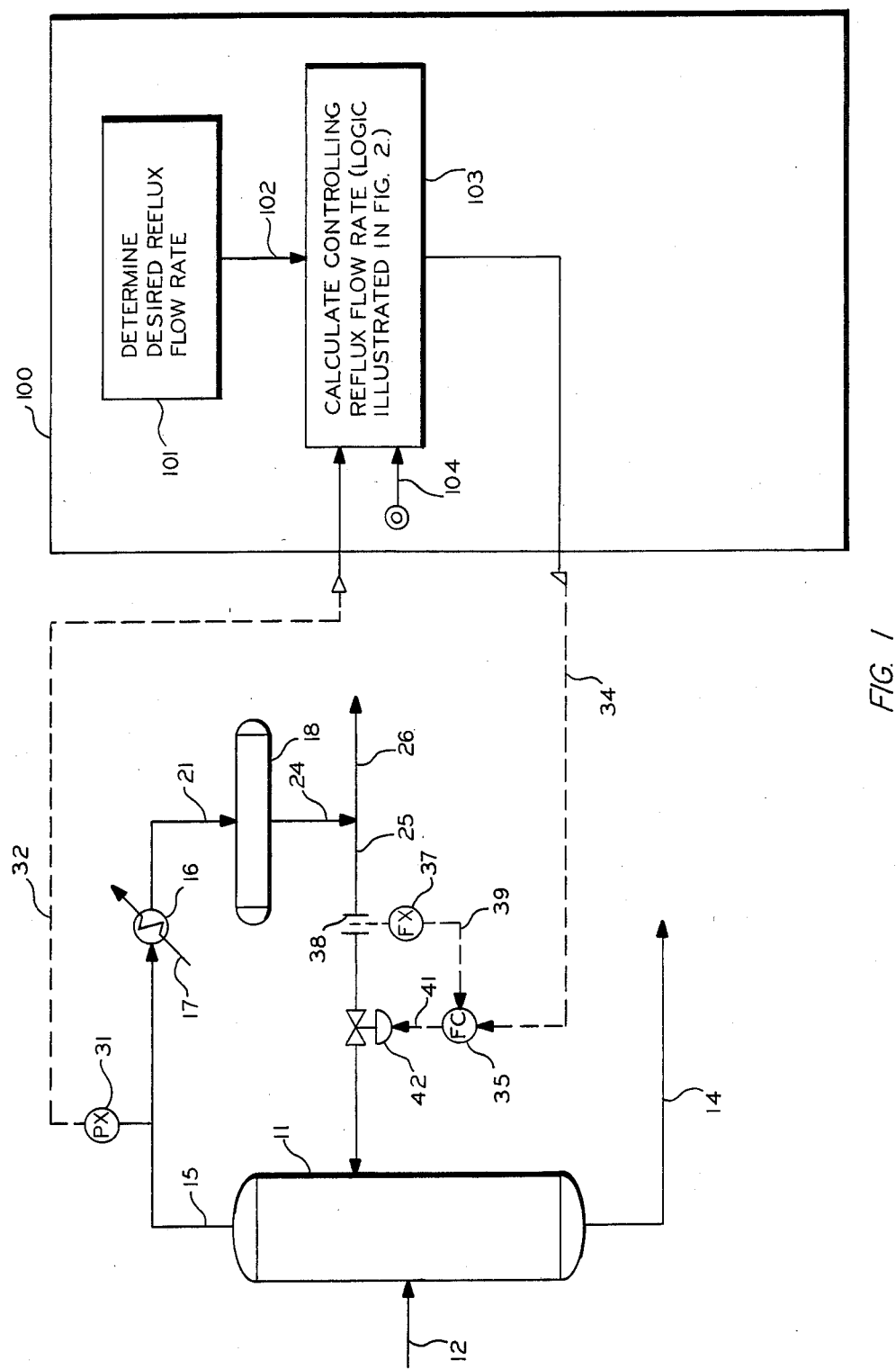

United States Patent [19]
Albers

[11] Patent Number: 4,578,152
[45] Date of Patent: Mar. 25, 1986

[54] CONTROL OF A FRACTIONAL DISTILLATION PROCESS

[75] Inventor: Lloyd R. Albers, Angleton, Tex.

[73] Assignee: Phillips Petroleum Company, Bartlesville, Okla.

[21] Appl. No.: 761,462

[22] Filed: Aug. 1, 1985

[51] Int. Cl.[4] .............................................. B01D 3/42
[52] U.S. Cl. .......................................... 203/1; 203/2; 202/160
[58] Field of Search ........................................ 203/1–3, 203/98, DIG. 18; 202/160; 196/132, 141; 208/DIG. 1; 364/501

[56] References Cited

U.S. PATENT DOCUMENTS

| | | | |
|---|---|---|---|
| 2,816,858 | 12/1957 | Walker | 203/2 |
| 3,282,799 | 11/1966 | MacMullan | 203/2 |
| 3,332,856 | 7/1967 | Hart | 203/2 |
| 3,342,698 | 9/1967 | Rijnsdorp | 203/2 |
| 3,361,646 | 1/1968 | MacMullan | 203/2 |
| 4,167,455 | 9/1979 | Bard | 203/2 |
| 4,182,657 | 1/1980 | Swindell | 203/2 |
| 4,377,443 | 3/1983 | Tuck et al. | 203/2 |
| 4,392,877 | 7/1983 | Funk | 202/160 X |
| 4,400,239 | 8/1983 | Hobbs | 196/132 |

OTHER PUBLICATIONS

Liptak, B. G., Instrument Engs. Handbook, vol. 2, pp. 1322–1328.

Primary Examiner—Wilbur Bascomb
Attorney, Agent, or Firm—French and Doescher

[57] ABSTRACT

A measurement of the pressure in a fractional distillation column is utilized to bias the desired external reflux flow rate which is determined by some conventional method. The bias is applied only when a pressure limitation is exceeded and the external reflux flow rate is reduced as a result of the bias which results in a reduction of column pressure.

4 Claims, 2 Drawing Figures

CONTROL OF A FRACTIONAL DISTILLATION PROCESS

This invention relates to control of a fractional distillation process. In one aspect, this invention relates to method and apparatus for controlling the pressure in a fractional distillation column.

Fractional distillation columns are employed in many chemical manufacturing processes to make desired separations. Typically, at least an overhead product and a bottoms product are removed from the fractional distillation process. The composition of the overhead product can be controlled by manipulating the bottoms product flow rate in response to an analysis of the overhead product while the composition of the bottoms product can be controlled by manipulating the flow rate of the external reflux in response to an analysis of the bottoms product.

There are many variations on the conventional control briefly described above. However, in all cases, the flows of various streams, such as the external reflux, are generally manipulated so as to maintain some desired process condition.

Conventional control may be applied to a fractional distillation process until some process constraint is violated. As an example of a violation which may occur and to which the present invention is specifically directed, column pressure may rise on hot summer days and may exceed a desired column pressure. This may not only inhibit the operation of the fractional distillation column but also presents a safety problem.

It is thus an object of this invention to provide method and apparatus for controlling a fractional distillation column in such a manner that conventional control will not cause a column pressure limitation to be exceeded even on hot days.

In accordance with the present invention, method and apparatus is provided whereby a measurement of the column pressure is utilized to bias the desired external reflux flow rate which is determined by some conventional method. The bias is applied only when a pressure limitation is exceeded and in this manner conventional control to maintain some desired process variable is applied to the maximum extent possible.

The particularly surprising aspect of the present invention is the fact that external reflux flow is decreased to decrease pressure. Since external reflux is considered a cooling fluid and the pressure increase on hot summer days is being caused by limitations on the cooling capacity of heat exchangers, fan coolers and other devices used to cool the column, it would seem that increasing the external reflux flow would decrease pressure. However, it has been found by actual operation that a reduction in external reflux flow will reduce column pressure where the rise in column pressure is caused by exceeding the cooling capacity of the fractional distillation process.

Figure 2:
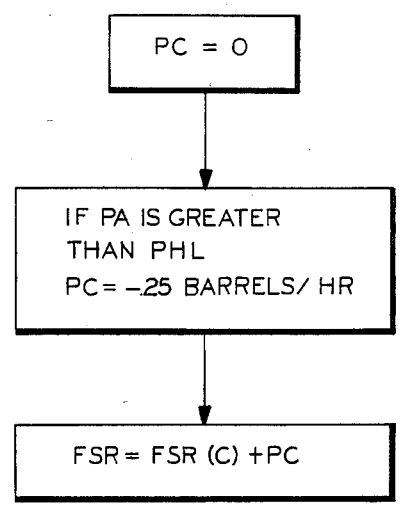

Other objects and advantages of the invention will be apparent from the foregoing brief description of the invention and the appended claims as well as from the detailed description of the drawings in which:

FIG. 1 is a diagrammatic illustration of a fractional distillation process with the associated control system of the present invention; and FIG. 2 is a logic diagram for the control utilized to generate the controlling set point for the external reflux flow rate.

The invention is illustrated and described in terms of a specific fractional distillation process for the separation of isopentane from normal pentane. The invention is also applicable to different types and configurations of fractional distillation processes in which pressure rises due to exceeding cooling capacity are encountered.

A specific control system configuration is set forth in FIG. 1 for the sake of illustration. However, the invention extends to different types of control system configurations which accomplish the purpose of the invention. Lines designated as signal lines in the drawings are electrical or pneumatic in this preferred embodiment. Generally, the signals provided from any transducer are electrical in form. However, the signals provided from flow sensors will generally be pneumatic in form. Transducing of these signals is not illustrated for the sake of simplicity because it is well known in the art that if a flow is measured in pneumatic form it must be transduced to electrical form if it is to be transmitted in electrical form by a flow transducer. Also, transducing of the signals from analog form to digital form or from digital form to analog form is not illustrated because such transducing is also well known in the art.

The invention is also applicable to mechanical, hydraulic or other signal means for transmitting information. In almost all control systems some combination of electrical, pneumatic, mechanical or hydraulic signals will be used. However, use of any other type of signal transmission, compatible with the process and equipment in use, is within the scope of the invention.

A digital computer is used in the preferred embodiment of this invention to calculate the required control signal based on measured process parameters as well as set points supplied to the computer. Analog computers or other types of computing devices could also be used in the invention. The digital computer is preferably an OPTROL 7000 Process Computer System from Applied Automation, Inc., Bartlesville, Okla.

Signal lines are also utilized to represent the results of calculations carried out in a digital computer and the term "signal" is utilized to refer to such results. Thus, the term signal is used not only to refer to electrical currents or pneumatic pressures but is also used to refer to binary representations of a calculated or measured value.

The controllers shown may utilize the various modes of control such as proportional, proportional-integral, proportional-derivative, or proportional-integral-derivative. In this preferred embodiment, proportional-integral-derivative controllers are utilized but any controller capable of accepting two input signals and producing a scaled output signal, representative of a comparison of the two input signals, is within the scope of the invention.

The scaling of an output signal by a controller is well known in control system art. Essentially, the output of a controller may be scaled to represent any desired factor or variable. An example of this is where a desired flow rate and an actual flow rate are compared by a controller. The output could be a signal representative of a desired change in the flow rate of some gas necessary to make the desired and actual flows equal. On the other hand, the same output signal could be scaled to represent a percentage or could be scaled to represent a temperature change required to make the desired and actual flows equal. If the controller output can range from 1 to 10 volts, which is typical, then the output signal could be scaled so that an output signal having a voltage level of 5.0 volts corresponds to 50 percent, some specified flow rate, or some specified temperature.

The various transducing means used to measure parameters which characterize the process and the various signals generated thereby may take a variety of forms or formats. For example, the control elements of the system can be implemented using electrical analog, digital electronic, pneumatic, hydraulic, mechanical or other similar types of equipment or combinations of one or more such equipment types. While the presently preferred embodiment of the invention preferably utilizes a combination of pneumatic final control elements in conjunction with electrical analog signal handling and translation apparatus, the apparatus and method of the invention can be implemented using a variety of specific equipment available to and understood by those skilled in the process control art. Likewise, the format of the various signals can be modified substantially in order to accommodate signal format requirements of the particular installation, safety factors, the physical characteristics of the measuring or control instruments and other similar factors. For example, a raw flow measurement signal produced by a differential pressure orifice flow meter would ordinarily exhibit a generally proportional relationship to the square of the actual flow rate. Other measuring instruments might produce a signal which is proportional to the measured parameter, and still other transducing means may produce a signal which bears a more complicated, but known, relationship to the measured parameter. Regardless of the signal format or the exact relationship of the signal to the parameter which it represents, each signal representative of a measured process parameter or representative of a measured process parameter or representative of a desired process value will bear a relationship to the measured parameter or desired value which permits designation of a specific measured or desired value by a specific signal value. A signal which is representative of a process measurement of desired process value is therefore one from which the information regarding the measured or desired value can be readily retrieved regardless of the exact mathematical relationship between the signal units and the measured or desired process units.

Referring now to the drawings and in particular FIG. 1, there is illustrated a fractional distillation column 11. A feed stream consisting essentially of isopentane and normal pentane is provided to the fractional distillation column 11 through conduit means 12. Normal pentane is removed as a bottoms product through conduit means 14. Isopentane is removed in an overhead vapor stream from the fractional distillation column 11 through conduit means 15. It is noted that, while the bottoms product stream will consist principally of normal pentane, it will also contain some concentration of isopentane. In like manner, the overhead product will contain some concentration of normal pentane.

The overhead stream flowing through conduit means 15 is provided from the fractional distillation column 11 through conduit means 15 to the heat exchanger 16. The heat exchanger 16 is provided with a cooling medium through conduit means 17. The at least partially condensed fluid stream from the heat exchanger 16 is provided to the overhead accumulator 18 through conduit means 21. A first portion of the liquid in the overhead accumulator 18 is provided through the combination of conduit means 24 and 25 as an external reflux to the fractional distillation column 11. A second portion of the liquid in the accumulator 18 is removed through the combination of conduit means 24 and 26 as the overhead product.

The fractional distillation process for separating isopentane from normal pentane described to this point is conventional. It is the manner in which the fractional distillation process is controlled so as to prevent a pressure limitation from being exceeded for any substantial period of time which provides the novel features of the present invention.

The pressure transducer 31 in combination with a pressure sensing device, which is operably located in conduit 15, provides an output signal 32 which is representative of the pressure of the overhead vapor stream. Signal 32 is also essentially equal to the pressure in the fractional distillation column 11. Signal 32 is provided from the pressure transducer 31 as an input to computer 100.

In response to signal 32 and other input signals which would be part of a conventional external reflux control system, computer 100 provides an output signal 34 which is representative of the desired flow rate of the external reflux through conduit 25. Signal 34 is provided as the set point input to the flow controller 35.

Flow transducer 37 in combination with the flow sensor 38, which is operably located in conduit 25, provides an output signal 39 which is representative of the actual flow rate of the external reflux through conduit 25. Signal 39 is provided as the process variable input to the flow controller 35.

In response to signals 34 and 39, the flow controller 35 provides an output signal 41 which is responsive to the difference between signals 34 and 39. Signal 41 is scaled so as to be representative of the position of the control valve 42, which is operably located in conduit 25, required to maintain the actual flow rate of the external reflux substantially equal to the desired flow rate as represented by signal 34. Signal 41 is provided as a control signal to the control valve 42 and the control valve 42 is manipulated in response thereto.

Referring now to the operation of computer 100, the determine desired reflux flow rate block 101 is representative of any desired conventional control system for the external reflux. Since there are many such conventional control systems and since the conventional control of the external reflux does not play a part in the present invention, a particular conventional control system will not be described. However, it is noted that a conventional control system which may be utilized is described in U.S. Pat. No. 4,400,239. Signal 102, which is representative of the flow rate of the external reflux required to maintain some process variable equal to a desired value, is provided as an input to the calculate controlling reflux flow rate block 103.

Signal 32 which is representative of the fractional distillation column 11 pressure is also provided as an input to the calculate controlling reflux flow rate block 103. Also, signal 104, which is representative of a high limit for the pressure in the fractional distillation column 11 is provided as an input to the block 103. In response to signals 32, 102 and 104, the calculate controlling reflux flow rate block 103 establishes signal 34 which is the set point for the flow rate of the external reflux. The manner in which signal 34 is established in response to signals 102, 104 and 32 is illustrated in FIG. 2.

Symbols utilized in FIG. 2 are defined as follows:

PC=the pressure compensating signal utilized to prevent the column pressure from exceeding a high limit for the column pressure represented by signal 104;

PA=signal 32;

PHL=signal 104;

FSR(C)=signal 102; and

FSR=signal 34.

Referring now to FIG. 2, the pressure compensation signal (PC) is first set equal to zero. A determination is then made as to whether the actual column pressure is greater than the high limit for the column pressure. If the actual column pressure is greater than the high limit for the column pressure, PC is set equal to −0.25 barrels per hour which will result in a decrease in the flow rate of the external reflux with respect to that required by the conventional control.

After the value of PC is determined, the magnitude of signal 34 is determined by adding the magnitude of signal 102 to the magnitude of PC.

In operation, the magnitude of signal 34 will be updated periodically. Preferably, the magnitude of signal 102 is also updated with the same periodicity as signal 34 and signal 102 might correspond to signal 81 of U.S. Pat. No. 4,400,239.

If the column pressure does not exceed a high limit, then the column pressure control of the present invention will have no effect and signal 34 will be equal to signal 102. However, in those situations where a column pressure exceeds a high limit, the column pressure control of the present invention will act to reduce the flow rate of the external reflux which will reduce column pressure.

Again, a particularly surprising aspect of the invention is the discovery that a reduction in external reflux flow rate will result in a reduction in column pressure where the pressure rise in the column is caused by high ambient temperatures causing the cooling capacity of the fractional distillation process to be exceeded.

The invention has been described in terms of a preferred embodiment as illustrated in FIGS. 1–2. Specific components used in the practice of the invention as illustrated in FIG. 1 such as flow sensor 38; flow transducer 37; flow controller 35; pressure transducer 31; and control valve 42 are each well known, commercially availale control components such as are described at length in Perry's Chemical Engineer's Handbook, 4th Edition, Chapter 22, McGraw-Hill.

For reasons of brevity, conventional auxilliary fractionation equipment such as pumps, heat exchangers, additional measurement-control devices, etc. have not been included in the above description as they play no part in the explanation of the invention. Also, the manner in which heat is supplied to the fractional distillation column has not been illustrated. In particular, the process measurements required to establish signal 102 have not been illustrated and control of heat input to the column as well as any control of the flow of the bottoms product have not been illustrated since these control aspects do not play any part in the description of the present invention.

While the invention has been described in terms of the presently preferred embodiment, reasonable variations and modifications are possible by those skilled in the art and such variations and modifications are within the scope of the described invention and the appended claims.

That which is claimed is:

1. Apparatus comprising:

a fractional distillation column means;

means for passing a feed mixture containing at least first and second components into said fractional distillation column means;

means for withdrawing an overhead vapor stream, having a substantially increased concentration of said first component in said feed mixture, from an upper portion of said fractional distillation column means;

means for condensing at least a portion of said overhead vapor stream;

accumulator means;

means for passing the resulting at least partially condensed overhead stream into said accumulator means;

means for withdrawing condensate from said accumulator means and for passing a first portion of the thus withdrawn condensate into an upper portion of said fractional distillation column means as an external reflux therefor and for passing a second portion of the thus withdrawn condensate as an overhead product stream;

means for withdrawing a bottoms product stream, having a substantially increased concentration of said second component with respect to the concentration of said second component in said feed mixture, from a lower portion of said fractional distillation column means;

means for establishing a first signal representative of the flow rate of said external reflux required to maintain a process variable at a desired value for a said process variable;

means for establishing a second signal representative of the actual pressure in said fractional distillation column means;

means for establishing a third signal representative of a high limit for the pressure in said fractional distillation column means;

means for comparing said second signal and said third signal and for establishing a pressure compensating signal which is responsive to the difference between said second signal and said third signal, wherein said pressure compensating signal has a magnitude of zero if the magnitude of said second signal is not greater than the magnitude of said third signal and has a first magnitude with the dimension of flow rate if said second signal is greater than said third signal;

means for combining said first signal and said pressure compensating signal to establish a control signal; and means for manipulating the flow rate of said external reflux in response to said control signal, wherein the first magnitude of said pressure compensating signal is such that combining said first signal and said pressure compensating signal results in a reduction in the flow rate of the external reflux required by said first signal if the actual pressure in said fractional distillation column means is greater than the high limit represented by said third signal.

2. Apparatus in accordance with claim 1 wherein said means for controlling the flow rate of said external reflux in response to said control signal comprises:

a control valve operably located so as to control the flow of said external reflux;

means for establishing a fourth signal representative of the actual flow rate of said external reflux;

means for comparing said fourth signal and said control signal and for establishing a fifth signal which is responsive to the difference between said fourth signal and said control signal, wherein said fifth signal is scaled so as to be representative of the position of said control valve required to maintain the actual flow rate of said external reflux substantially equal to the desired flow rate represented by said control signal; and means for manipulating said control valve in response to said fifth signal.

3. A method for preventing the actual pressure in a fractional distillation column from exceeding a high limit for the pressure in said fractional distillation column, wherein said fractional distillation column is utilized to separate first and second components contained in a feed stream flowing to said fractional distillation column, wherein said first component is principally removed from said fractional distillation column as an overhead vapor stream, wherein said overhead vapor stream is at least partially condensed with a first portion of the condensate being returned to an upper portion of said fractional distillation column as an external reflux and a second portion of said condensate being removed from said fractional distillation process as an overhead product, and wherein said second component is principally removed from said fractional distillation column as a bottoms product, said method comprising the steps of:

establishing a first signal representative of the flow rate of said external reflux required to maintain a process variable at a desired value for a said process variable;

establishing a second signal representative of the actual pressure in said fractional distillation column means;

establishing a third signal representative of a high limit for the pressure in said fractional distillation column means;

comparing said second signal and said third signal and establishing a pressure compensating signal which is responsive to the difference between said second signal and said third signal, wherein said pressure compensating signal has a magnitude of zero if the magnitude of said second signal is not greater than the magnitude of said third signal and has a first magnitude with the dimension of flow rate if said second signal is greater than said third signal;

combining said first signal and said pressure compensating signal to establish a control signal; and manipulating the flow rate of said external reflux in response to said control signal, wherein the first magnitude of said pressure compensating signal is such that combining said first signal and said pressure compensating signal results in a reduction in the flow rate of the external reflux required by said first signal if the actual pressure in said fractional distillation column means is greater than the high limit represented by said third signal.

4. A method in accordance with claim 3 wherein said step of controlling the flow rate of said external reflux in response to said control signal comprises:

establishing a fourth signal representative of the actual flow rate of said external reflux;

comparing said fourth signal and said control signal and establishing a fifth signal which is responsive to the difference between said fourth signal and said control signal, wherein said fifth signal is scaled so as to be representative of the position of a control valve, operably located so as to control the flow of said external reflux, required to maintain the actual flow rate of said external reflux substantially equal to the desired flow rate represented by said control signal; and manipulating said control valve in response to said fifth signal.

* * * * *